Sept. 7, 1965    S. H. ROBLEY    3,204,417
UNDERWATER PIPE LAYING APPARATUS
Filed Oct. 28, 1963    7 Sheets-Sheet 4

INVENTOR.
SPENCER H. ROBLEY
BY Knox & Knox

Sept. 7, 1965  S. H. ROBLEY  3,204,417
UNDERWATER PIPE LAYING APPARATUS
Filed Oct. 28, 1963  7 Sheets-Sheet 5

INVENTOR.
SPENCER H. ROBLEY
BY Knox & Knox

Sept. 7, 1965  S. H. ROBLEY  3,204,417
UNDERWATER PIPE LAYING APPARATUS
Filed Oct. 28, 1963  7 Sheets-Sheet 7

INVENTOR.
SPENCER H. ROBLEY
BY Knox & Knox so that the cross beam can be adjusted vertically. Mounted on the cross beam 44 is a carriage 50 which is movable laterally between frames 40 on rollers 52, and is actuated by a jack 54. On top of the carriage 50 is a rotatable turntable 56 having brackets 58 with a transverse hinge pin 60 on which is mounted a yoke 62, fixed securely to and supporting an end of spine 36. The feet, frames, cross beam and yoke are illustrated as being constructed from channel section beams and the like, but it will be obvious that tubular or other structure may be used. By means of the cradle 32 the one end of spine 36 can be moved vertically and horizontally, the turntable 56 and hinge pin 60 allowing for all such motions.

3,204,417
UNDERWATER PIPE LAYING APPARATUS
Spencer H. Robley, La Crescenta, Calif., assignor to Gunther and Shirley Company, Sherman Oaks, Calif.
Filed Oct. 28, 1963, Ser. No. 319,126
7 Claims. (Cl. 61—72.3)

The present invention relates generally to pipe laying and more specifically to underwater pipe laying apparatus.

In laying pipe underwater, particularly large pipe, it is difficult to place and joint sections of pipe accurately. With the pipes slung from cranes or the like the operation must either be carried out by divers, or remotely controlled from the surface, or the pipe sections can be pre-assembled on the surface and lowered into place. Numerous divers would be required to handle large pipes and would be working under difficult conditions, while remote control would be practical only in shallow water where the pipes were visible from the surface, both of these systems being adversely affected by rough water or currents. Pre-assembling pipe sections on the surface would simplify the proper sealing of the joints, but lowering the assembled pipes onto a possibly uneven surface below water, would in most cases, break the joints and damage the pipes.

As one example of the problem, an underwater pipe system such as a sewer outfall into the ocean may involve sections of pipe 24 feet long, 7 feet in diameter and weighing up to 30 tons each. These may have to be laid at a depth of 200 feet or more on an uneven sea bed.

The primary object of this invention is to provide apparatus which can be lowered into the water carrying a section of pipe, seated on an uneven surface to be independent of support from above and, with the pipe fully supported, operated to align the pipe accurately with previously placed pipes or connections, then further operated to seat and connect the pipe and hold it in place while a suitable footing or support is built up.

Another object of this invention is to provide apparatus capable of handling large pipes at great depths under the supervision of a single diver, the operations being controlled from the surface and guided by the diver, or controlled by the diver himself with a minimum of effort.

Another object of this invention is to provide apparatus which is contained in an integral unit and need not be specially set up and assembled underwater for each section of pipe.

A further object of this invention is to provide apparatus which is easily transportable, as a unit, on a floating platform, barge, or other vessel, together with a supply of pipe, making it possible to lay a considerable length of pipe in a continuous operation.

In the accompanying drawings.

Similar characters of referenc indicate similar or identical elements and portions throughout the specification and throughout the views of the drawing.

General structure

Figure 1:
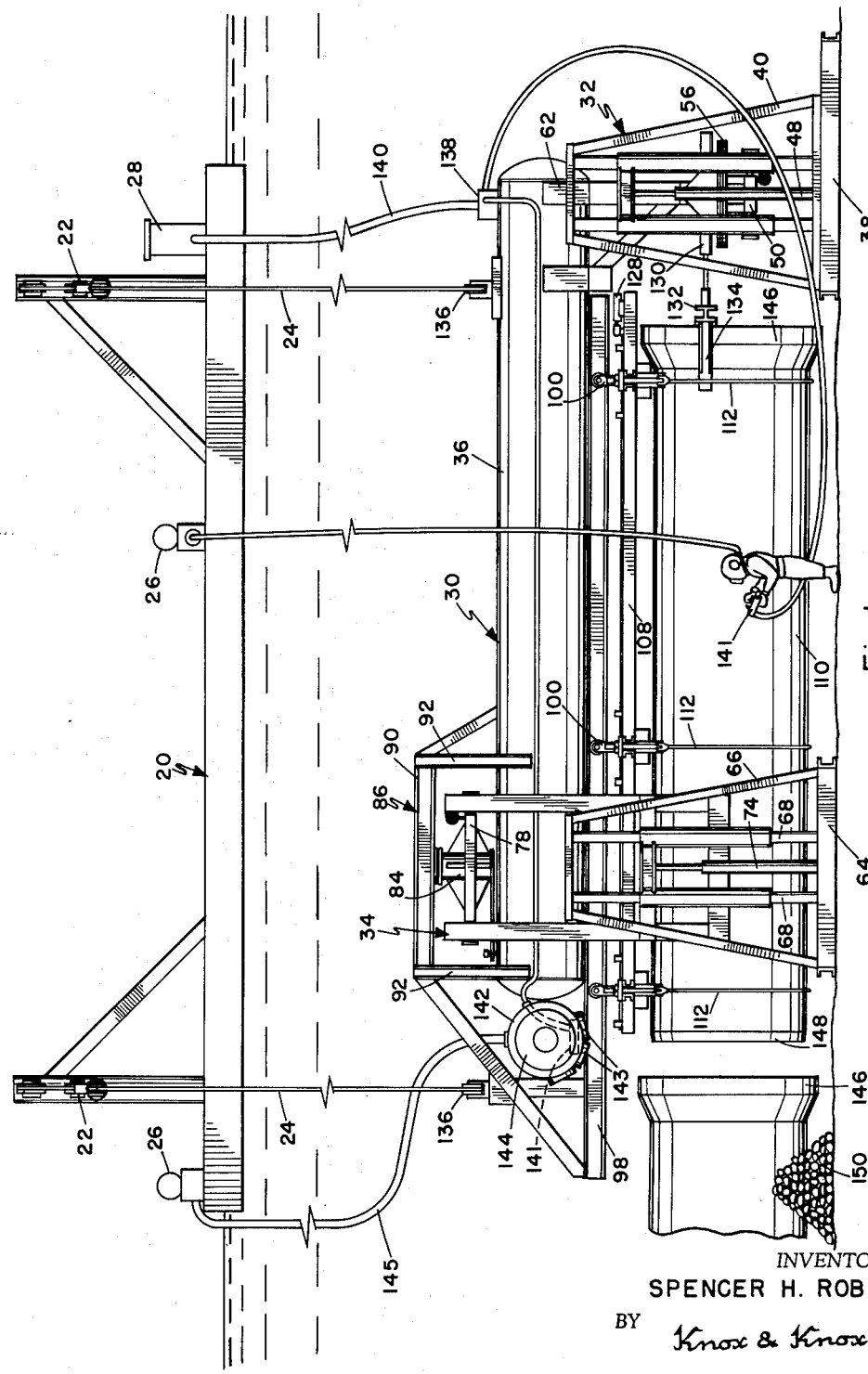
FIGURE 1 is a side elevation view of the complete apparatus in operation.
Figure 2:
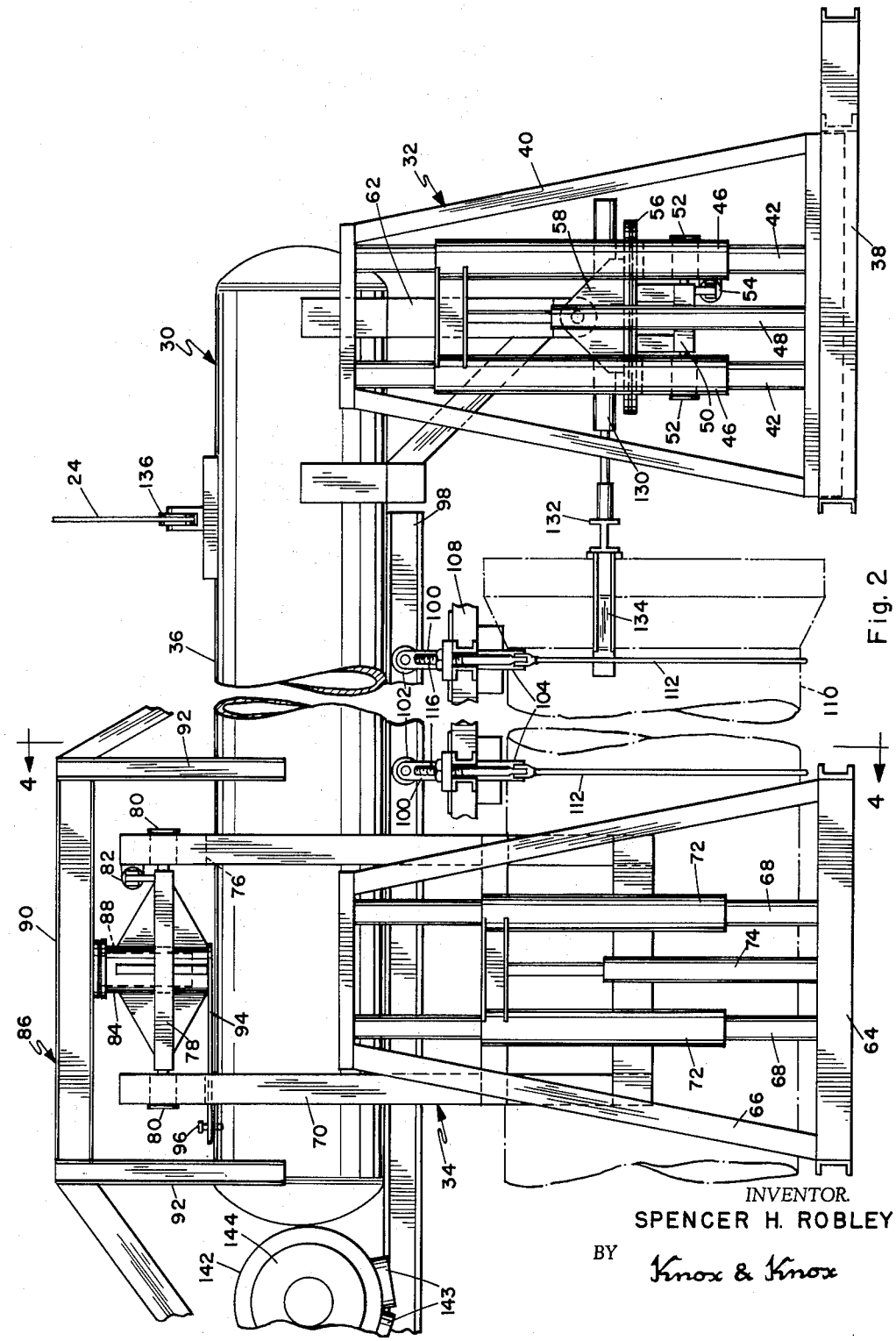
FIGURE 2 is an enlarged side elevation view of the pipe handling unit.
Figure 3:
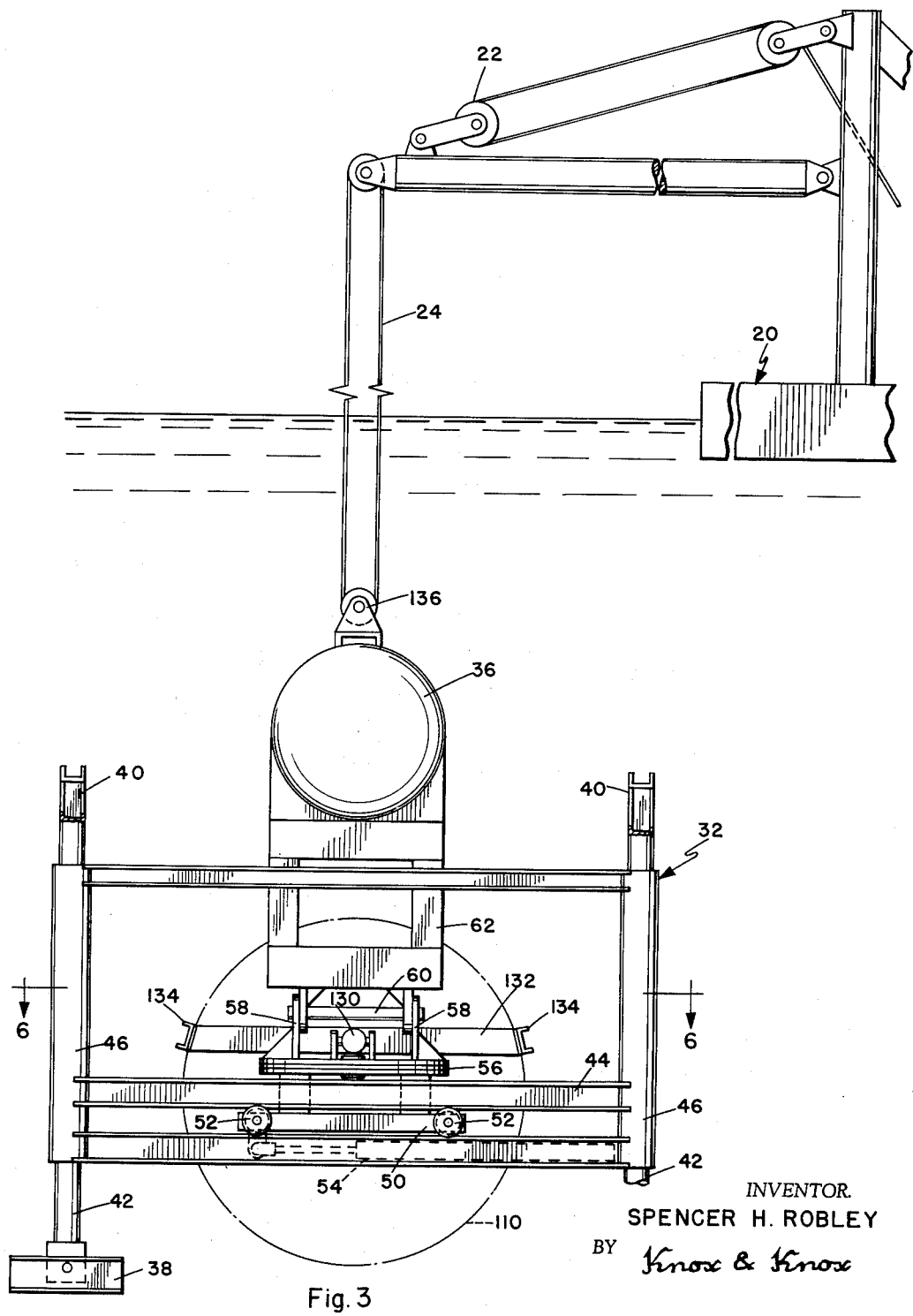
FIGURE 3 is an end elevation view of a portion of the unit as taken from the right end of FIGURE 2.
Figure 4:
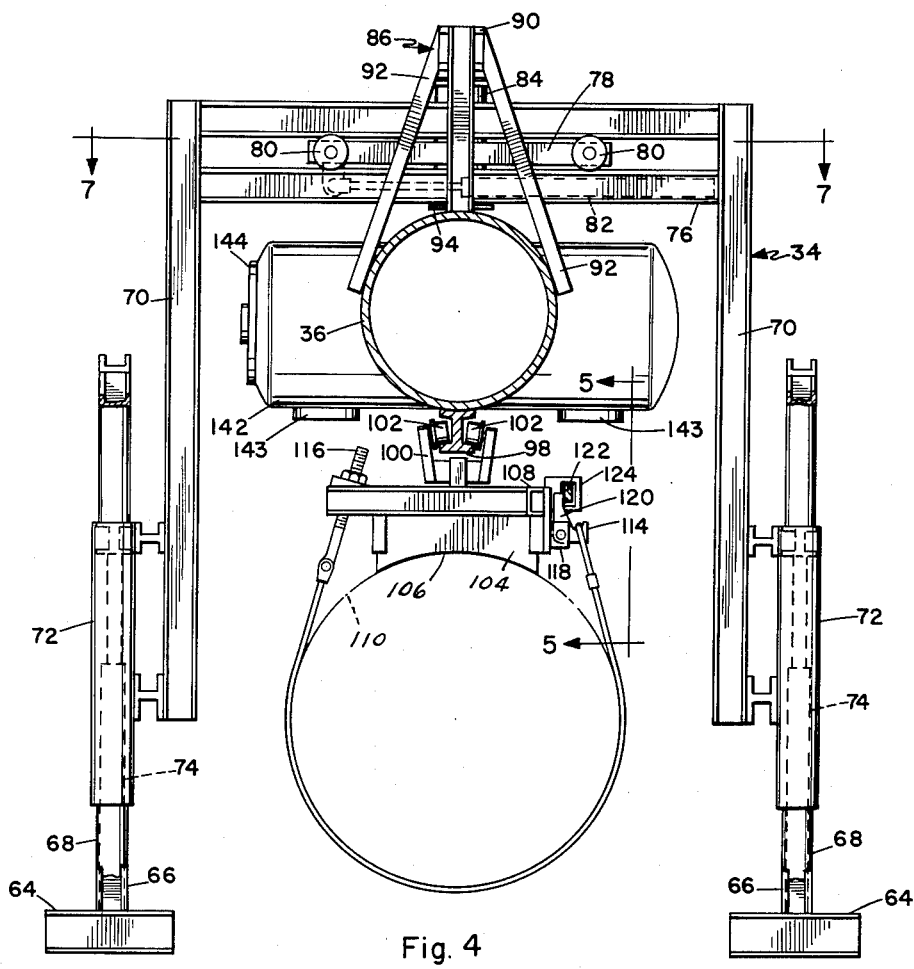
FIGURE 4 is a sectional view taken on line 4—4 of FIGURE 2.
Figure 5:
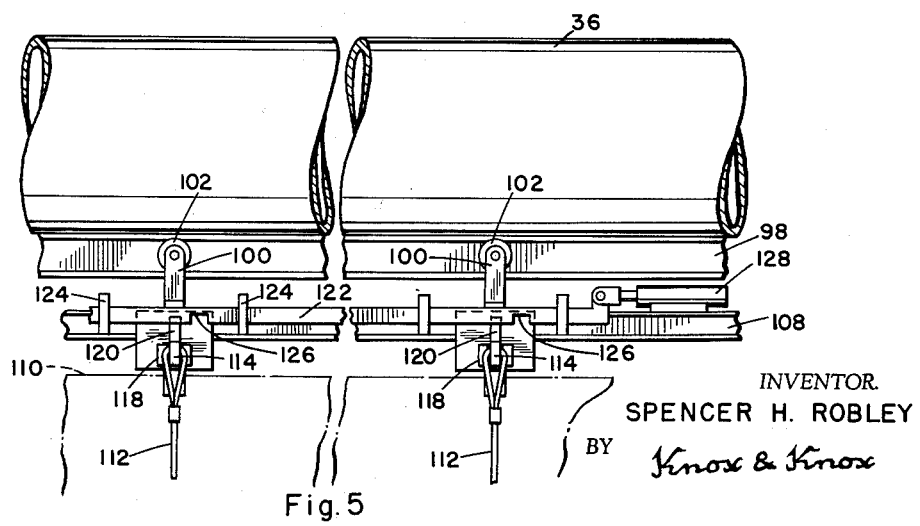
FIGURE 5 is a fragmentary view taken in the direction of arrows 5—5.
Figure 6:
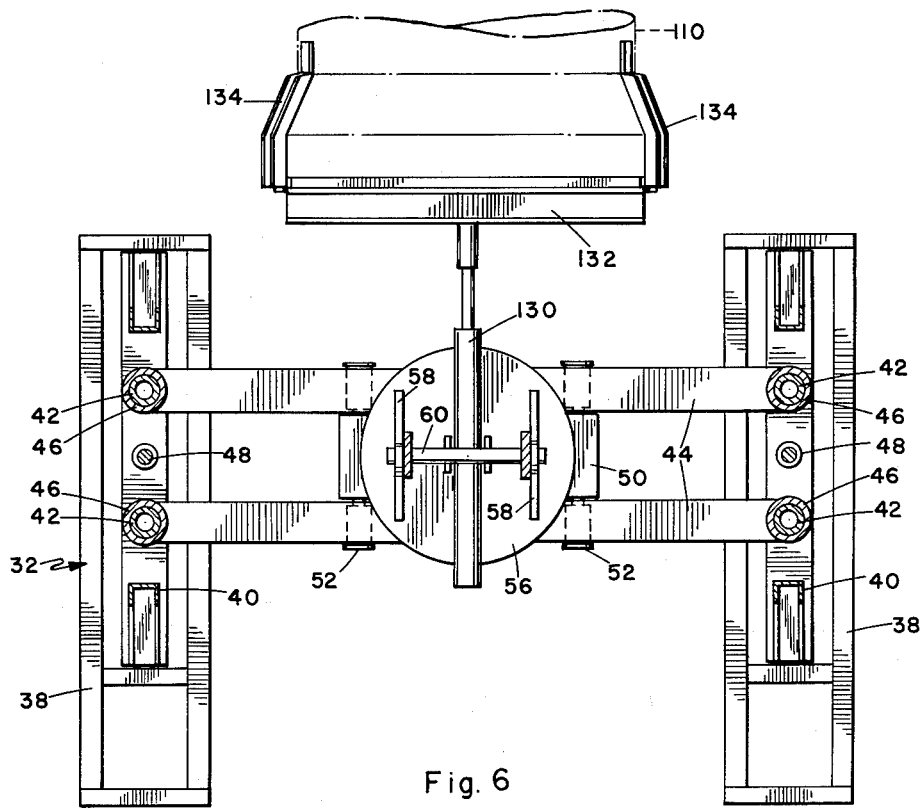
FIGURE 6 is a sectional view taken on line 6—6 of FIGURE 3.
Figure 7:
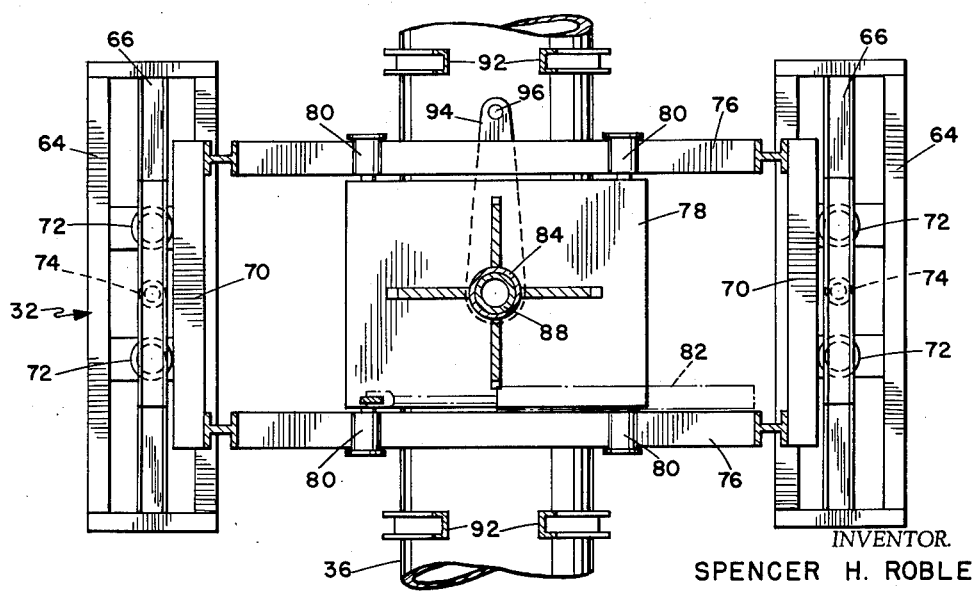
FIGURE 7 is a sectional view taken on line 7—7 of FIGURE 4.

The apparatus as illustrated in FIGURES 1–7 comprises a floating platform 20 and a pipe handling unit 30. The platform 20 is equipped with hoists 22 of any suitable type capable of raising and lowering the unit 30 by means of cables 24, the platform itself being any convenient floating structure such as a barge or other vessel, either self powered or adapted for towing. Compressed air sources 26 and a control unit 28 are carried on platform 20 for purposes hereinafter described.

Pipe handling unit

The pipe handling unit 30 has supporting frame means comprising a positioning cradle 32 and a gantry 34 joined by a rigid beam or spine 36, which is illustrated as being an elongated cylindrical tank, but may be any beam-like member of suitable strength.

The cradle 32 has a pair of large feet 38 on which are upright frames 40 having vertical guide posts 42, the feet being frame structures which rest on the ocean floor. Between the frames 40 is a cross beam 44 fixed to sleeves 46 which ride on the guide posts 42, and in each frame is a linear actuator such as a jack 48 connected to the cross beam, so that the cross beam can be adjusted vertically. Mounted on the cross beam 44 is a carriage 50 which is movable laterally between frames 40 on rollers 52, and is actuated by a jack 54. On top of the carriage 50 is a rotatable turntable 56 having brackets 58 with a transverse hinge pin 60 on which is mounted a yoke 62, fixed securely to and supporting an end of spine 36. The feet, frames, cross beam and yoke are illustrated as being constructed from channel section beams and the like, but it will be obvious that tubular or other structure may be used. By means of the cradle 32 the one end of spine 36 can be moved vertically and horizontally, the turntable 56 and hinge pin 60 allowing for all such motions.

The gantry 34 has frame-like feet 64 with upright side frmae 66 in which are vertical guide posts 68. Mounted on each side frame 66 is a support frame 70 having sleeves 72 which ride on guide posts 68, and between the guide posts are jacks 74 by which the support frames are raised and lowered. The upper ends of support frames 70 are connected by a cross beam 76 passing above the spine 36, said cross beam supporting a carriage 78 which is laterally movable on rollers 80 and operated by a jack 82.

Fixed to the carriage 78 is an upright bearing sleeve 84, and secured to the top of spine 36 is a suspension frame 86 having a downwardly extending pin 88 which is rotatable in said sleeve. Suspension frame 86 can be any suitably braced frame, that illustrated having a top beam 90 supported by braces 92 straddling the spine 36. The spine 36 can thus be moved vertically and horizontally in gantry 34 and can pivot on pin 88.

At the lower end of bearing sleeve 84 is an arm 94 extending longitudinally along spine 36 and having a lock pin 96 which secures the arm to the spine. This lock pin is used to prevent relative turning of the spine and gantry while the unit is being put into position under water and is removed before the pipe placing operation begins.

Fixed to the underside of spine 36 is a longitudinal track or rail 98 on which are mounted a plurality of hangers 100 having rollers 102. Each hanger 100 carries a saddle 104 having an arcuate recess 106 in the lower edge to fit the pipe to be handled, the pipe being indicated at 110 in FIGURE 4. The pipe is secured to each hanger 100 by a cable 112 held at one end on a hook 114 and passing below the pipe to a tensioning bolt 116 on the other side. All of the hangers are interconnected by a longitudinal coupling bar 108 to move in unison along rail 98. Each hook 114 is pivotally mounted on a bracket 118 and has a tongue 120 which is engaged by a locking bar 122 longitudinally slidable in guides 124. The locking bar 122 has notches 126 adjacent the hooks 114, as in FIGURE 5, and is moved longitudinally by a jack 128, or the like, to bring the notches into registration with tongues 120, so releasing all the hooks simultaneously.

Mounted on the turntable 56 is a seating jack 130 carrying a push bar 132 which bears against the end of pipe 110 and is provided with retaining arms 134 extending along both sides of the pipe. Seating jack 130 thus moves the pipe 110 longitudinally along rail 98.

The cables 24 are attached to the opposite ends of spine 36 around pulleys 136, or to other suitable fittings, depending on the particular cable arrangement used.

All of the jacks are preferably fluid actuated, since these can be easily made water tight, but other linear actuator means can be used. Power is supplied from the control unit 28 to the jacks through a junction box 138 on the spine 36, or at some other convenient location to consolidate the necessary pressure hoses, indicated at 140 in FIGURE 1. The type of system capable of providing selective push-pull action of multiple actuators is well known and need not be described in detail, all of the components being conventional. In addition, a portable control unit 141 for use by a diver, as in FIGURE 1, may be coupled to the junction box 138.

Since the diver's working time in deep water must be very limited, a diving chamber 142 is mounted at the end of spine 36 adjacent the pipe joint to be made, the chamber being secured above rail 98 and suitably braced. The diving chamber 142 is provided with a plurality of conveniently located viewing ports 143 and an entrance hatch 144, the interior being suitably fitted out to accommodate an operator. Chamber 142 is coupled to a compressed air source 26 by a hose 145 so that atmospheric pressure can be maintained therein for the occupant. A remote control unit 141 can be installed in the chamber 142 so that the pipe alignment operation can be carried out or assisted from this position if desired.

Operation

The pipe handling unit 30 is carried on platform 20 to the location where pipe is to be laid and is loaded with a section of pipe 110 while on the platform, the pipe being secured in the saddles by the cables 112. The entire unit is then lowered into the water, the inactive jacks and the lock pin 96 preventing motion of the spine 36 relative to the supporting frame structures, so avoiding damage to the pipe. As the unit reaches the ocean floor, it is placed as close as possible to the previously laid pipe and in general alignment therewith. This can be accomplished by guidance from a diver by telephone, the arrangement being well known.

The type of pipe illustrated has an enlarged bell 146 at one end and a plug end 148 which fits into the bell of the next pipe section. Various types of pipe joints are used and the specific details of completing and sealing the connections are not critical.

With the pipe in approximate position, the various jacks can be operated to align the pipe axially with the previously laid section, as in FIGURE 1. Both the cradle 32 and gantry 34 can move the pipe vertically and horizontally and to any angular position within the limits of motion of the structure. At all times the movements are controlled by the diver, or operator in diving chamber 142, from visual observation, either through instructions to the operator at control unit 28 or by portable control unit 141. By this means the pipe can be aligned very accurately. Once aligned, the seating jack 130 is operated to move the pipe along its axis to seat into the previous section of pipe and make a proper joint.

With the joint made the pipe is still supported in the handling unit until a bedding of rocks or other material, indicated at 150 in FIGURE 1, can be built up to support the pipe. When the pipe is securely bedded, the locking bar 122 is actuated to release cables 112 from the hooks 114. The handling unit 30 is then raised to the surface to be loaded with the next section of pipe.

Modified pipe handling unit

Figure 8:
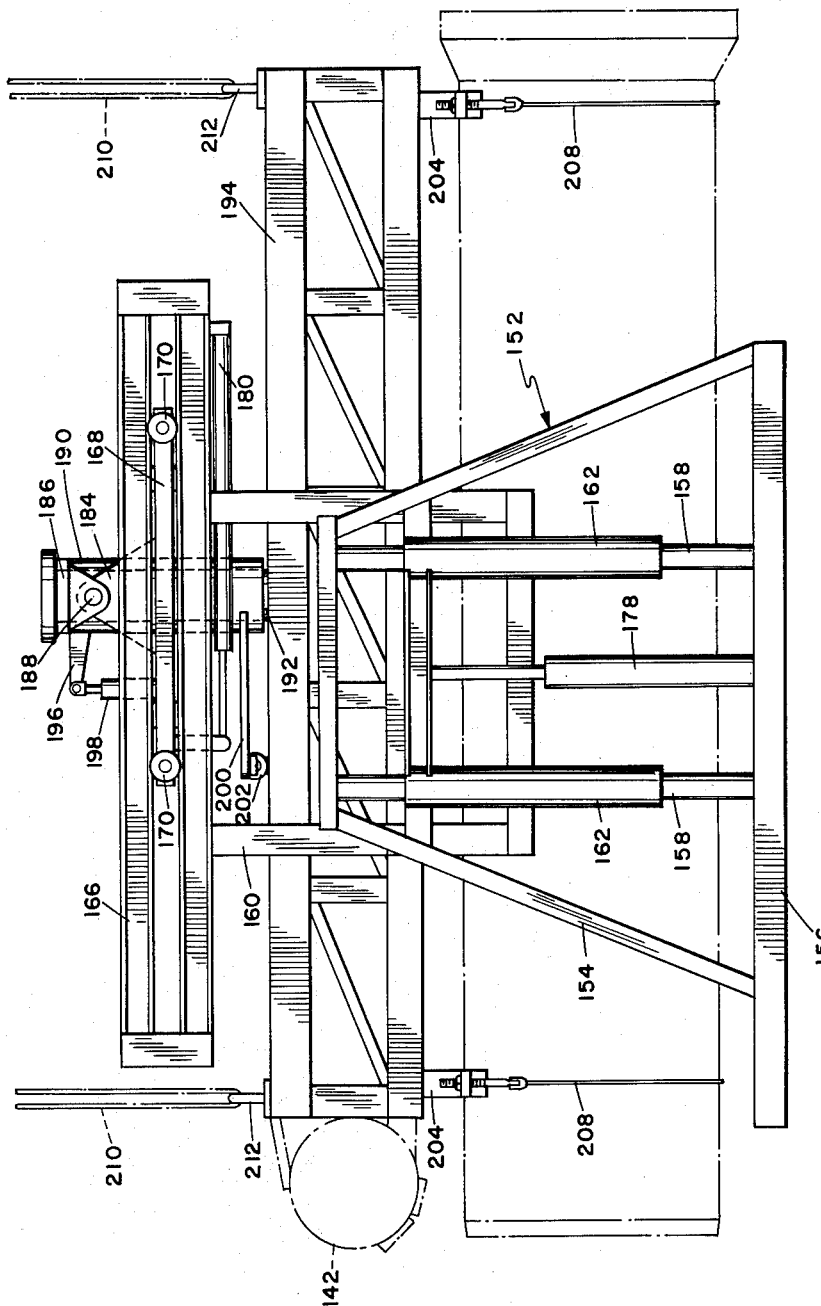
FIGURE 8 is a side elevation view of a modified form of the pipe handling unit.
Figure 9:
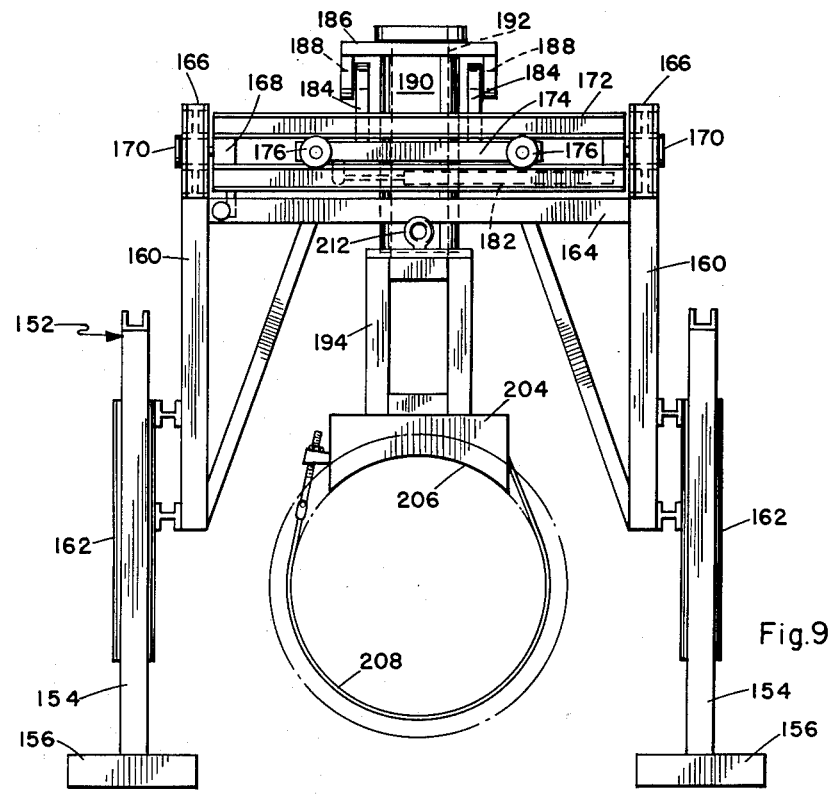
FIGURE 9 is an end elevation view as taken from the right end of FIGURE 8.
Figure 10:
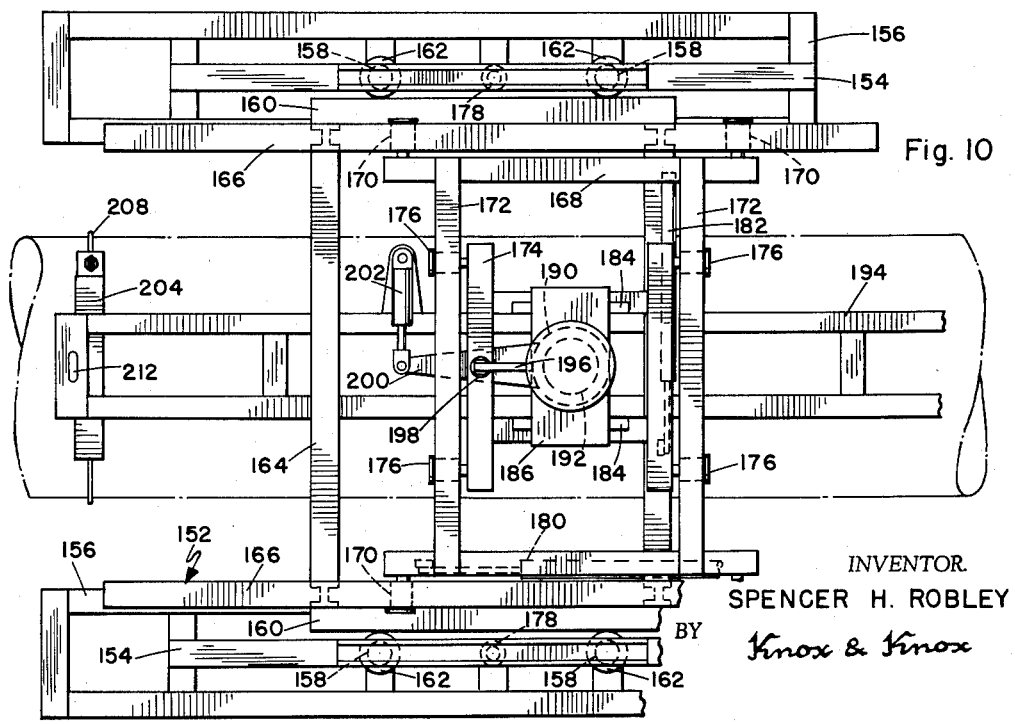
FIGURE 10 is a top plan view of the unit illustrated in FIGURE 8.

The modified unit illustrated in FIGURES 8–10 utilizes a gantry 152 having side frames 154 with feet 156, the side frames containing upright guide posts 158. Mounted on the side frames 154 are supporting frames 160 having sleeves 162 which ride on the guide posts 158, said supporting frames being joined at their upper ends by a suitably braced cross beam 164. Fixed to the tops of supporting frames 160 are longitudinal beams 166, between which is mounted a carriage 168 on rollers 170. The carriage 168 has transverse beams 172 between which a second carriage 174 is mounted on rollers 176, said second carriage thus being movable longitudinally and laterally relative to the gantry. Jacks 178 are installed in side frames 154 to raise and lower supporting frames 160. Carriage 168 is operated by a jack 180 and carriage 174 by a further jack 182.

Fixed to carriage 174 are brackets 184 on which is mounted a yoke 186 pivotal on hinge pins 188 about an axis parallel to transverse beams 172. Extending downwardly from yoke 186, through the carriage assembly, is a bearing sleeve 190 in which is journalled a post 192, rotatable but held against axial movement. Secured to the lower end of post 192 is an elongated rigid spine 194, illustrated as a trussed beam structure.

Extending longitudinally from the upper end of bearing sleeve 190 is an arm 196 from which a jack 198 is connected substantially vertically to the frame 174, to tilt the bearing sleeve, and the spine 194, about hinge pins 188. At the lower end of bearing sleeve 190 is a fixed arm 200 from which a jack 202 is connected horizontally to the spine 194, to swing the spine about the axis of post 192. By this means the spine 194 can be moved longitudinally and laterally, swung laterally and tilted longitudinally in the same manner as the spine 36 of the previously described pipe handling unit 30.

At opposite ends of the spine 194 are depending saddles 204 having arcuate recesses 206 to receive pipe 110, which is held by cable 208. The cables can be attached to the saddles in a manner similar to that described for cable 112.

The gantry 152 is suspended from supporting cable 210 passed through eyes 212, or similar fittings, on the spine 194 and is operated in the water in the manner described above for the pipe handling unit 30.

A diving chamber 142 may be attached to the end of spine 194, as indicated in broken line in FIGURE 8, for control of the pipe positioning operation.

Either form of the pipe handling apparatus provides a considerable range of adjustment of the pipe and initial placement of the apparatus is greatly simplified. During positioning of the pipe the apparatus is supported on the ocean floor, independent of the platform, and is not affected by rough water conditions or currents. Thus very accurate alignment of the pipe is possible and properly sealed joints can be made consistently. While the apparatus is most effective under water, it will be obvious that it is also adaptable to handling large heavy pipes on land, such as in the construction of aqueducts and the like.

It is understood that minor variation from the form of the invention disclosed herein may be made without departure from the spirit and scope of the invention, and that the specification and drawings are to be considered as merely illustrative rather than limiting.

I claim:
1. An underwater pipe laying apparatus comprising:
a rigid frame means including horizontally spaced parallel transverse members and depending legs in rigidly fixed relation thereto adjacent each end;

an elongated spine spanning said transverse members;

said spine having portions disposed toward each end thereof movably secured to the transverse members for movement of the spine and said portions longitudinally of said transverse members;

means operatively connected to and between said spine and the frame means providing movement of the longitudinal axis of the spine to a position having a direction other than at right angles to the parallel axes of the transverse members; and depending hanger means longitudinally movably supported by the spine for supporting a pipe section beneath said spine and between said legs.

2. Apparatus according to claim 1 wherein said portions comprise carriage means and said spine is pivotally mounted on said carriage means mounted to travel longitudinally on said transverse members.

3. Apparatus according to claim 2 wherein the second mentioned means comprises reversible power means operatively connected between said frame means and said carriage means.

4. Apparatus according to claim 1 wherein said hanger means includes spaced hangers and release means for simultaneous release of said hangers.

5. Apparatus according to claim 4 and including remote control means for the second mentioned means and said release means.

6. Apparatus according to claim 1 and including means for releasibly locking said spine against movement relative to said transverse members.

7. Apparatus according to claim 1 and including a pressurized diving chamber mounted on said apparatus adjacent one end of said spine, to accomodate an operator, and having viewing means and control means in said chamber for said second mentioned means and said hanger means.

References Cited by the Examiner

UNITED STATES PATENTS

| Re 23,963 | 3/55 | Collins | 61—72.4 |
| 436,914 | 9/90 | Fischer | 61—72.3 |
| 967,857 | 8/10 | Taylor | 212—22 |
| 1,152,326 | 8/15 | Lewis | 61—72.4 |
| 1,874,081 | 8/32 | Burrows | 61—72.3 |
| 2,040,956 | 5/36 | Romano | 61—69 |
| 2,333,208 | 11/43 | Spear | 61—72.1X |
| 2,551,174 | 5/51 | Shipman et al. | |
| 2,553,378 | 5/51 | Miller | 212—21 |
| 2,600,761 | 6/52 | Halliburton | 61—46.5 |
| 2,612,279 | 9/52 | Simmons | 214—394 |
| 3,075,603 | 1/63 | Baudhuin. | |
| 3,081,883 | 3/63 | Minty | 214—394 |

EARL J. WITMER, *Primary Examiner.*